Oct. 9, 1923.
C. YOUNG
WHEEL
Filed Oct. 18, 1917  2 Sheets-Sheet 1
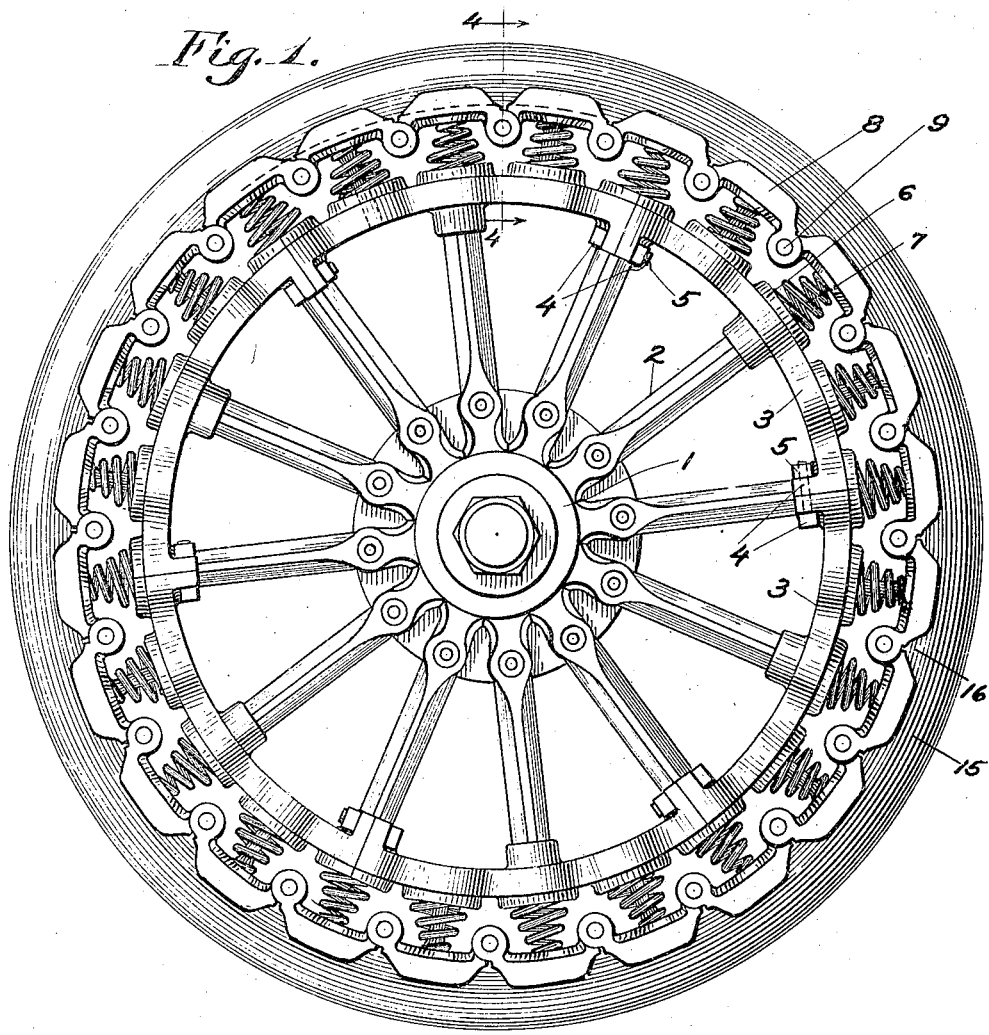
Fig. 1.
Fig. 2.
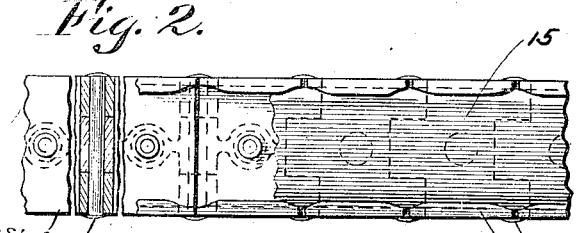
Witnesses:
Inventor:
Carl Young
By Parker & Carter Attys Oct. 9, 1923.  
C. YOUNG  
WHEEL  
Filed Oct. 18, 1917  
1,469,867  
2 Sheets-Sheet 2

Witnesses:

Inventor:
Carl Young
By
Parker Carter Attys

Patented Oct. 9, 1923.

1,469,867

UNITED STATES PATENT OFFICE.

CARL YOUNG, OF CHICAGO, ILLINOIS.

WHEEL.

Application filed October 18, 1917. Serial No. 197,329.

*To all whom it may concern:*

Be it known that I, CARL YOUNG, a citizen of the United States, residing at Chicago, in the county of Cook and State of Illinois, have invented a certain new and useful Improvement in Wheels, of which the following is a specification.

This invention relates to wheels and has for its object to provide a new and improved wheel with an elastic tread and a flexible steel perimeter arranged so as to secure a result similar to that of a pneumatic tire without its disadvantages. The invention is illustrated in the accompanying drawings, wherein—

Fig. 1 is a view of one form of wheel embodying the invention.

Fig. 2 is a view of a portion of the periphery of the wheel with parts in section.

Like numerals refer to like parts throughout the several figures.

Figure 5:
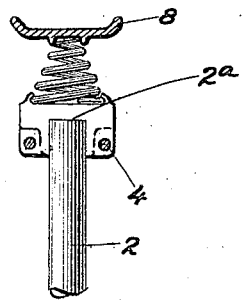
Fig. 5 is a sectional view taken on line 5—5 of Fig. 6.
Figure 4:
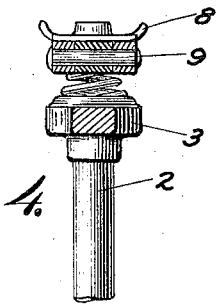
Fig. 4 is a sectional view taken on line 4—4 of Fig. 1.

In carrying out my invention I provide a suitable hub 1 and a series of spokes 2 connected with an outer rim. The spokes and rim are preferably made of metal. The rim is preferably made up of sections 3. As illustrated in Fig. 1 one spoke engages each section of the rim near its middle, the ends of the section engaging the adjacent spokes. The spokes fit in recesses in the sections and do not extend all the way therethrough but engage a seat $2^a$ as shown in Fig. 5. These sections are provided with lugs 4 and are clamped about the spokes which they engage by the bolts 5. The outer periphery of the rim is provided with a series of seats 6 for a series of springs 7 which are preferably spiral, coiled springs. These seats are shown as dish-shaped projections on the rim. Engaging the outer ends of these springs is a flexible steel perimeter made up of a series of sections or links 8 pivoted together by the pivots 9, the pivots being intermediate the springs. Located at intervals around the wheel are the pins 10 which form radial guides. These guides are connected with the links or sections of the flexible perimeter and work in suitable openings in the rim of the wheel. I prefer to place these guides within the spiral springs and I also prefer to have every alternate spiral spring provided with a guide. One of these guides is shown in detail in Fig. 3. At the point where the guides project into the rim I prefer to provide a projecting part 12 at each side of each guide (see Fig. 3) so as to provide a greater engagement area with the guide, and thus prevent binding. The guide may be connected to the links or sections 8 by means of a screw thread as shown, and I prefer to provide a projecting annulus 13 which projects between coils of the spring and holds the outer end of the spring in position against the link with which it is associated, said link being provided with a seat 14 consisting of a cup-shaped projection. The seats on the periphery of the wheel for the springs are provided with bent outer edges $6^a$ as shown in Fig. 3 so as to hold the inner coil of the spring against displacement, and in such sections the seat will have a cut-away portion $10^d$ so that the end of the spring may be placed in the cut-away portion and then the spring turned until the entire inner coil is in place.

I prefer to have this construction where the springs surround the guides. The springs intermediate the guides may have ordinary cup-shaped seats. A tire 15 of flexible or elastic material, such as solid rubber or the like, is placed around the flexible steel or metal perimeter. It will be seen that by means of this construction the tire is free to give at any point as each of the links is pressed out by a spring and the links are pivoted together, and hence, a result similar to that of a penumatic tire is secured, and there is still a wheel which is proof against punctures and rough usage and is particularly adapted for use in military operations.

Figure 3:
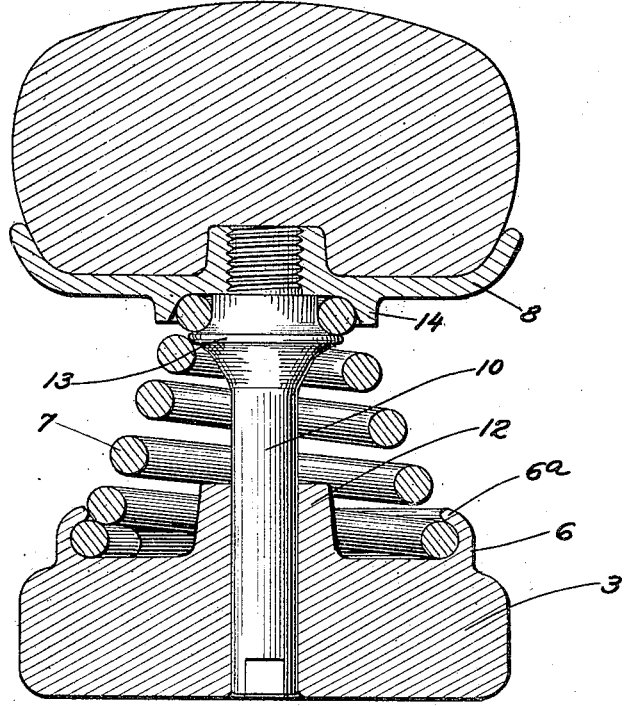
Fig. 3 is an enlarged sectional view taken on line 3—3 of Fig. 6.
Figure 6:
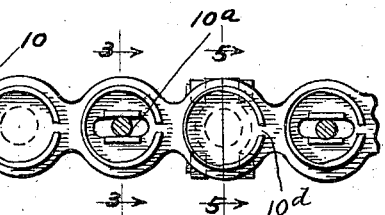
Fig. 6 is a plan view of a portion of the rim of the wheel.

The openings $10^a$ in the rim sections 3 into which the guides 10 pass are elongated as shown in Fig. 6, so that while the guides engage the walls of the openings at the sides as shown in Fig. 3 there can be no lateral movement, the guides and rim are free to have a certain relative circumferential movement. This permits the parts to give circumferentially when stresses are put thereon as by striking obstacles or the like.

In the drawings I have shown the guides or pins 10 as placed in every alternate spring, but it is of course evident that each spring may be provided with a guide or pin or that they may be distributed in any other desired manner.

I claim:

1. A wheel comprising a hub, spokes connected therewith, a rim connected with said spokes, elongated guiding openings in said rim, a flexible metal perimeter exterior to said rim, said flexible metal perimeter made up of a series of links, pivots connecting said links together, a spiral coiled spring interposed between each link and the rim of the wheel, and guides connected with certain of said links and projecting into said elongated guiding openings in said rim.

2. A wheel comprising a hub, spokes connected therewith, a rim connected with said spokes, a flexible metal perimeter exterior to said rim, said flexible metal perimeter made up of a series of links, pivots connecting said links together, a spiral coiled spring interposed between each link and the rim of said wheel, cup-shaped seats on said rim in which the ends of said springs are received, guides rigidly connected with certain of said links and projecting into openings in said rim, said guides surrounded by the said springs.

3. A wheel comprising a hub, spokes connected therewith, a rim connected with said spokes, a flexible metal perimeter exterior to said rim, said flexible metal perimeter made up of a series of links, pivots connecting said links together, said pivots being out of alignment with the main body of said links, a coiled spring interposed between each link and the rim of said wheel, seats on said rim in which the ends of said springs are received, guides rigidly connected with certain of said links and projecting into openings in said rim, said guides surrounded by the said springs.

In testimony whereof, I affix my signature in the presence of two witnesses this 28th day of September, 1917.

CARL YOUNG.

Witnesses:
MINNIE M. LINDEMAN,
MARION L. INGRAHAM.